March 17, 1970 C. E. PURDIE ET AL 3,501,053
POWDER MEASURE APPARATUS
Filed July 30, 1968
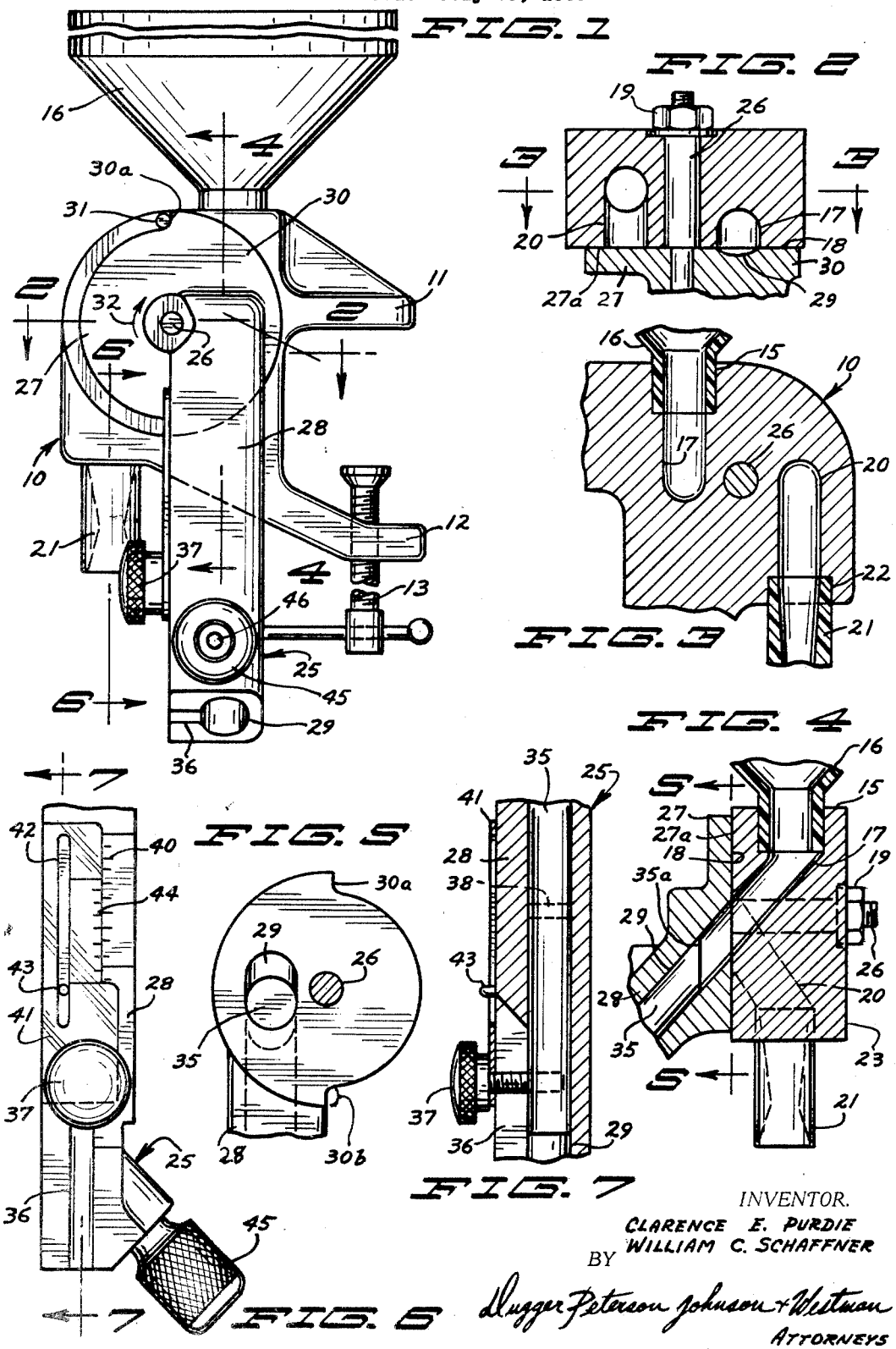
INVENTOR.
CLARENCE E. PURDIE
WILLIAM C. SCHAFFNER
BY
Dugger Peterson Johnson + Westman
ATTORNEYS

# United States Patent Office 3,501,053
Patented Mar. 17, 1970

3,501,053
POWDER MEASURE APPARATUS
Clarence E. Purdie, Faribault, and William C. Schaffner, Minneapolis, Minn., assignors to Bonanza Sports, Inc., Faribault, Minn., a corporation of Minnesota
Filed July 30, 1968, Ser. No. 748,831
Int. Cl. B67d 5/22; G01f 11/10
U.S. Cl. 222—47                                    18 Claims

ABSTRACT OF THE DISCLOSURE

A powder measure including a main body having a top opening, a bottom opening, spaced first and second powder passageways opening to a main body surface vertically intermediate said top and bottom openings, a hopper for discharging powder through the top opening, a handle assembly pivotally mounted on the main body to in a first position receive powder from the first passageway, and in a second position discharge the received powder to the second passageway, said handle assembly including vernier charge bar means for selectively adjusting the volume of powder that can be transferred by pivoting the handle assembly between its positions.

BACKGROUND OF THE INVENTION

This invention is directed to a powder measure that transfers a predetermined volume of powder from an inlet powder passageway to a discharge powder passageway.

In prior art powder measures having a rotatable handle, the handle is connected to a cylinder or drum rotatably mounted in the main body of the measure, the cylinder having a recessed chamber to receive a charge of powder intermediate the opposite sides of the main body. However, such prior art devices do not maintain the desired accuracy of charge dispensed, have the desired ease in setting for varying the powder charge to be dispensed, and the convenience of emptying the powder hopper. In order to overcome problems of the above mentioned nature, this invention has been made.

SUMMARY OF THE INVENTION

A powder measure having a main body with a side surface, a hopper on the main body to discharge powder into a passageway in the main body that opens through said main body surface, a second powder passageway in the main body opening to said side surface for conducting a measured charge of powder to a discharge tube, and a handle assembly pivotally mounted on the main body, said handle assembly having a side surface in abutting relationship with the main body side surface and having a bore for receiving powder from the first passageway when the handle assembly is in one angular position and discharging powder into the second passageway when the handle assembly is in a second angular position.

With the powder measure of this invention, the main body has a planar surface and a handle assembly with a side surface abutting against the main body surface. The handle assembly has an adjustable volume measuring chamber with a charge bar therein that has a surface which will form a close fit with the main body surface such that said bar and main body surface may provide shearing surfaces. Another feature of the invention is that the charge bar may be removed whereby powder may flow from a hopper mounted on the main body and through the handle assembly into a suitable storage container.

BRIEF DESCRIPTION OF THE DRAWINGS

FIGURE 1 is a side elevational view of the powder measure apparatus of this invention with part of the hopper broken away, said view showing the handle assembly in a position for receiving powder from the hopper;

FIGURE 2 is a horizontal cross sectional view generally taken along the line and in the direction of the arrows 2—2 of FIGURE 1 to show the relative location of the first and second powder passageways, and the opening of the handle assembly bore to one of said passageways;

FIGURE 3 is a fragmentary vertical cross sectional view generally taken along the line and in the direction of the arrows 3—3 of FIGURE 2 to illustrate the opening of the hopper to the first powder passageway, the opening of the second passageway to the discharge tube and the location of said passageways relative the pivot member;

FIGURE 4 is a fragmentary cross sectional view generally taken at right angles to that of FIGURE 3, said view being generally taken along the line and in the direction of arrows 4—4 of FIGURE 1;

FIGURE 5 is a fragmentary vertical elevational view of the handle assembly, said view being generally taken along the line and in the direction of the arrows 5—5 of FIGURE 4;

FIGURE 6 is a fragmentary vertical elevational view of the handle assembly illustrating the vernier adjustment feature, said view being generally taken along the line and in the direction of arrows 6—6 of FIGURE 1; and FIGURE 7 is a fragmentary cross sectional view generally taken along the line and in the direction of the arrows 7—7 of FIGURE 6 to show the mounting of the charge bar in the handle assembly bore.

Referring now in particular to FIGURES 1-4, the apparatus of this invention includes a main body, generally designated 10, that has integrally formed jaws 11 and 12. A clamp member 13 is threadedly mounted in jaw 12 for being threadably moved away from and toward jaw 11 for mounting the main body on an appropriate support such as a table (not shown). For purpose of further describing the invention, it will be assumed that the apparatus of this invention is mounted on a table that is supporting it in a position of use.

The main body has a vertical top aperture 15, the main body mounting a hopper 16 that has the lower reduced diameter end portion thereof removably located in aperture 15 to discharge into the main body first powder passageway 17. The powder passageway 17 is inclined downwardly at a sharp angle to open through the vertical annular main body side surface 18, the powder passageway opening to the side surface at a substantially lower elevation than the lower end of the hopper 16.

A sharply downwardly inclined second powder passageway 20 has its upper end opening through surface 18 at substantially the same elevation that passageway 17 opens through said surface, but substantially horizontally spaced therefrom. The lower end of passageway 20 opens to the upper end of a discharge tube 21 that is mounted in a bottom aperture 22 of the main body. The discharge tube has a top opening of substantially the same diameter as passageway 20, thence in a downward direction is tapered inwardly, and thereafter curves outwardly to discharge at a substantially lower elevation than the main body. As a result of the tapering of the discharge tube, cartridge cases having necks of various diameters may be positioned to have their upper edge abut against the appropriate diameter portion of the discharge tube.

A handle assembly, generally designated 25, is joined to a horizontal pivot member 26 that extends perpendicular to the surface 18 and is located horizontally intermediate the openings of passageways 17 and 20 to said surface 18. The top and bottom apertures 15, 22 are about equally horizontally spaced from the main body opposite side surfaces 18, 23; and are equally spaced in a horizontal direction from the vertical plane of the pivot axis of pivot member 26.

The handle assembly includes a generally cylindrical portion 27 that has an annular, planar, vertical surface 7a retained in abutting relationship with the planar surface 18 through a washer abutting against the surface 23 of the main body which is opposite surface 18 and a nut threaded on pivot member 26 to abut against said washer. Integrally joined to the cylindrical portion 27 on the side opposite surface 27a of said cylindrical portion is one end of an elongated handle portion 28. Cylindrical portion 27 and handle portion 28 have an elongated bore 29 extending therethrough.

Integrally joined to the cylindrical portion 27 to extend radially outwardly thereof is an arcuate flange 30 that extends angularly through 180°. Flange 30 has a first generally radially extending edge 30a for abutting against the pin 31 when the handle assembly is in a position that bore 29 receives powder from passageway 17, the pin 31 being mounted on the main body to extend outwardly of surface 18. Flange 30 has a second generally radially extending edge surface, designated by bracket 30b, for abutting against pin 31 when the handle assembly has been rotated 180° in the direction of arrow 32 about the axis of pivot member 26 to position the bore 29 to open to passageway 20. Thus, the elongated portion 28 is joined to the cylindrical portion to extend outwardly thereof at an angle that bore 29 forms substantially a straight line continuation of the first passageway 17 when surface 30a abuts against the pin 31, and a straight line continuation of passageway 20 when surface 30b abuts against said pin. In this connection the elongated portion 28 is joined to the cylindrical portion to be generally located on one side of the pivot member 6; and when surface 31a abuts against pin 31 is inclined downwardly relative to a horizontal plane of the axis of pivot member 26 (i.e. a horizontal plane that is perpendicular to surfaces 18, 27a), and is elongated in a direction generally parallel to the vertical plane of the axis of pivot member 26.

Slidably mounted in bore 29 is an elongated charge bar 35 that is of a size and shape to prevent passage of powder through the bore. The charge bar has an end surface 5a that is parallel to surface 18 such that when the surface 35a is aligned with surface 27a, substantially no powder can pass from passageway 17 into the bore 29. Further, through structure described hereinafter, the position of the charge bar is adjustable such that surfaces 18, 35a may be in close contact to provide shearing surfaces to prevent powder grains getting between these surfaces.

In order to retain the charge bar 35 in an adjusted position in the bore along the length thereof, the handle portion 28 is provided with a slot 36 that is elongated in the direction of elongation of the handle portion, opens to the bore 29 and is of a smaller width than the bore. The slot extends from an intermediate portion of member 28 to open through the end thereof that is remote from the cylindrical portion 27 and opens through a surface of handle portion 28 that is parallel to a plane containing the pivotal axis of pivot member 26. A cap screw 37 is extended through the slot 35 and threaded into one of the two apertures 38 in the charge bar.

In order to gauge the position of the plunger surface 5a relative surface 25a a plurality of equally spaced indicia 40 are formed on a surface of the elongated portion 28 through which slot 36 opens to provide a scale. An elongated slider 41 is slidably mounted on the elongated portion 28 by having the cap screw 37 extended through an aperture in one end of said slider. The slider also has an elongated slot 42 through which a pin 43 is extended, said pin being mounted by portion 28 intermediate the opposite ends of the scale thereon. Thus, when the cap screw is unthreaded such that the head portion does not clampingly bear against the slider 41 and thereby retain the slider and charge bar in a fixed position relative the elongated portion 28, the slider may be moved in a direction parallel to the direction of elongation of the charge bar. The slider has a plurality of indicia 44 that are equally spaced to form a vernier scale, the spacing of the indicia 44 being less than the spacing of the indicia 40.

In order to facilitate rotating the handle assembly about the axis of pivot 26, said assembly includes a handle member 45 rotatably mounted on a pivot member 46. Pivot member 46 is mounted on the handle portion 28 to have its axis parallel to the pivot axis of pivot member 26.

In using the apparatus of this invention, it is clamped to appropriate support structure such as a table by turning the clamp member 13 in the appropriate direction. Thereafter, provided it has not already been done, the cap screw 37 is loosened and reciprocated along the length of the slot 36 in a direction that the charge bar surface 35a is moved away from surface 27a the maximum distance, the movement of the charge bar in this direction being limited by pin 43 abutting against the end of slot 42 that is remote from knurled cap screw 37 and the aperture 38 in which said cap screw is threaded. This provides a hollow charge cavity in bore 29. With the handle assembly in the down position (surface 30a abutting against pin 31), a charge of powder weighed on a scale is emptied into the hopper and flows down into bore 29. Then the handle assembly is rotated to a neutral position (for example 90° to a position bore 29 does not open to either of passageways 17, 20) and then the charge bar is moved in bore 29 toward surface 18 to a position the weighed charge just fills the space in bore 29 between surfaces 18, 29a. Now the cap screw 37 is tightened to lock the charge bar in place and the hopper filled with powder, it being understood that if no slider were provided, the head of the cap screw would abut against the elongated handle portion 28 to retain the charge bar in a fixed position in bore 29.

Upon rotating the handle assembly to a position that flange surface 30a abuts against pin 31, powder will flow through passageway 17 into bore 29. That is, bore 29 forms a downwardly inclined continuation of the passageway 17 at this time.

Thereafter, the handle assembly is rotated in the direction of arrow 32 about the pivot axis of pivot member 26 to a position that surface 30b abuts against pin 31. When surface 30b abuts against pin 31, the powder flows from bore 29 into powder passageway 20 and thence down through the discharge tube to discharge into a cartridge case that is positioned to receive powder from the discharge tube. As previously noted, when pin 31 abuts against surface 30b, bore 29 forms a straight line continuation of passageway 20. Further, prior to the time that the handle assembly has been pivoted in the direction of arrow 32 sufficiently to initially open to passageway 20 and until it has been pivoted to a position that bore 29 is substantially coextensive with passageway 20, the surface 27a of the cylindrical portion prevents powder from being discharged from passageway 17 through its opening in surface 18. Subsequently, the handle assembly is again rotated in the direction opposite arrow 32 to a position that bore 29 again opens to passageway 17 and another cartridge case is positioned beneath tube 21 to receive powder therefrom. Advantageously the angle of inclination of passageway 17 relative the surface 27a in an upward direction is about 45° while the passageway 20 is angled downwardly relative the surface at the same angle. Further, the handle portion 28 advantageously extends at a 45° angle relative surface 27a in a direction parallel to a plane containing the pivotal axis of pivot member 26. However, the angle of extension of the handle portion and base 29 relative to surface 27 may be varied between about 40-75°.

After the hopper is initially filled, the first charge or two that is dispensed through tube 21 is weighed, and if not correct the position of the charge bar in the bore adjusted, the amount of adjustment made being visually observed on the vernier scale. After such adjustment, if necessary, subsequent charges do not have to be weighed when the same powder is being used on the same day, although advantageously every tenth charge or so may be weighed on a scale for purposes of checking. In this connection, it is to be noted the uniformity of charges will vary from day to day and are a function of temperature, humidity, static and type of charge.

In using the apparatus of this invention, the handle assembly is to be moved with a slow, steady movement when rotated in the direction opposite arrow 32 so that a given volume of powder flowing into bore 29 will have the desired weight.

After charging cartridge cases, the cap screw is unthreaded from the charge bar, the charge bar removed from bore 29, and with the handle assembly in the position that surface 30a abuts against pin 31; powder in the hopper flows downwardly through passageway 17 and bore 29 into a suitable storage container positioned beneath the handle assembly. To be noted, at this time, slot 36 opens to bore 29 at any one location along the length thereof horizontally relative the bore intermediate the top and lower bore portions whereby powder in flowing through the bore will not flow outwardly through the slot. Also, the slot opens outwardly of the handle assembly such that when the handle assembly has been rotated 90° in the direction of arrow 32 from the position illustrated in FIGURE 1, the slot opens upwardly.

What we claim is:

1. A powder measure for dispensing a given charge of powder comprising a powder measurer main body having a side surface, a top aperture, a bottom aperture, a first vertically extending passageway opening to said top aperture and opening through said side surface at a lower elevation than said top aperture, and a second vertically extending powder discharge passageway opening to said bottom aperture and opening through the above mentioned side surface at a higher elevation than said bottom aperture, a powder hopper mounted on said body for discharging powder through said top aperture to said first passageway, a handle assembly having a side surface, and means for mounting said handle assembly on the main body for movement relative the main body between a first position and a second position and retain the side surfaces adjacent one another, said handle assembly having first means for receiving a charge of powder of a given volume from the first passageway when the handle assembly is in its first position and discharging the given volume of powder to second passageway when the handle assembly is in its second position.

2. The apparatus of claim 1 further characterized in that said handle assembly and main body having cooperating means for limiting the movement of the handle assembly relative the main body between said positions.

3. The apparatus of claim 1 further characterized in that said first means includes a handle portion having an elongated bore, said bore having one end opening through the handle assembly surface, a charge bar slidably mounted in said bore to block the bore at a location remote from the handle assembly surface and second means on the handle portion for retaining the charge bar in a given position in said bore.

4. The apparatus of claim 3 further characterized in that said handle assembly has an elongated slot remote from said handle assembly surface that opens to said bore, and that said second means comprises a cap screw extended through said slot and threaded into the charge bar.

5. The apparatus of claim 4 further characterized in that said handle assembly has a first scale axially aligned with said bore, and that there is provided a slider having an elongated slot and a pin extended through said slider slot, said screw being extended through said slider to move the slider with the charge bar and to retain the charge bar and slider in fixed position relative the handle portion, said slider having a vernier scale to in conjunction with the first scale indicate the relative volume of the bore between the charge bar and the handle assembly surface.

6. The apparatus of claim 1 further characterized in that the means for mounting the handle assembly on the main body comprises a horizontally elongated pivot member and that said passageways open to the main body surface on diametrically opposite sides of said pivot member.

7. The apparatus of claim 6 further characterized in that said first means comprises a generally cylindrical portion having said handle assembly surface and an elongated portion having one end joined to said cylindrical portion and an opposite end, said elongated portion extending outwardly of said cylindrical portion at a substantial angle relative the pivot axis of said pivot member, and said handle assembly portions having an elongated bore that has an axis of elongation parallel to the direction of elongation of said elongated portion.

8. The apparatus of claim 7 further characterized in that said first passageway is inclined relative the horizontal at about the same angle as said bore when the handle assembly is in the first position and that the second passageway is inclined relative the horizontal at about the same angle as said bore when the handle assembly is in its second position.

9. The apparatus of claim 8 further characterized in that said handle assembly and main body have cooperating means for limiting the movement of the handle assembly relative the main body between said positions, said cooperating means comprises a handle assembly flange portion integrally joined to said cylindrical portion ot extend radially outwardly thereof and a pin stationarily mounted on the main body to abut against said flange when the handle assembly is in each of its limit positions.

10. The apparatus of claim 8 further characterized in that said first means comprises a charge bar mounted in said bore for blocking the bore at a given location spaced from the handle assembly surface and adjustment means for retaining the charge bar in a given position in said bore.

11. The apparatus of claim 10 further characterized in that said bore opens through the handle portion remote from said cylindrical portion, said bore being a straight line bore and said charge bar being reciprocally slidable in said bore for removal therefrom.

12. A powder measure for dispensing a given volume charge of powder comprising a powder measurer main body having a vertical planar surface, a top aperture, a bottom aperture, a first diagonally extending passageway opening to said top aperture and opening through the above mentioned surface at a lower elevation than said top aperture, and a second diagonally extending passageway opening to said bottom aperture and opening through said main body surface at a higher elevation than said bottom aperture, a powder hopper mounted on said body for discharging powder through said top aperture to said first passageway, a handle assembly having a first portion, said first portion having a planar surface to abut against the main body surface, a pivot member for connecting said handle assembly to the main body to maintain said surfaces in abutting realtionship and mount the handle assembly for pivotal movement about a pivot axis perpendicular to said surfaces, said handle assembly having an elongated second portion joined to said first portion to extend away therefrom at an acute angle to a plane parallel to said surfaces, said handle assembly having a bore that is elongated in the direction of elongation of said second portion that opens through said handle assembly surface to said first passageway when the handle assembly is in one pivoted position, and to the second passageway when the handle assembly is in a second pivoted position, said bore in the handle assembly second pivoted position opening to the main body at a lotion remote from the first passageway, and means on the handle assembly for blocking said bore at a location at least a slight distance away from the handle assembly surface in a direction away from the main body.

13. The apparatus of claim 12 further characterized in that said main body has a pair of vertically spaced jaws, and that there is provided a clamp member that is mounted in one of said jaws and a discharge tube mounted in the upper main body to extend into said bottom aperture.

14. The apparatus of claim 12 further characterized in that said passageways open to the main body surface on generally horizontally opposite sides of said pivot member when the powder measure is in a position for being used.

15. A powder measure for dispensing a given charge of powder comprising a powder measure main body having a first surface, a top aperture, a bottom aperture, a first powder passageway opening to said top aperture and through said first surface at a lower elevation than said top aperture, and a second powder passageway opening to said bottom aperture and through said first surface at a higher elevation than said bottom aperture, a handle assembly having a second surface abuttable against said first surface, a bore opening through said second surface, and a charge bar mounted in said bore to limit the powder receiving capacity of said bore, and means for mounting said handle assembly on the main body with said surfaces in abutting engagement for pivotal movement relative the main body between a first position that said bore opens to the first passageway, a second position that the bore opens to the first surface out of powder flow communication with both of said passageways, and a third position that the bore opens to the second passageway.

16. The apparatus of claim 15 further characterized in that said surfaces are substantially planar.

17. The apparatus of claim 15 further characterized in that said passageways are inclined at sufficiently steep angles to permit gravity flow of powder and are straight line passageways, and that said bore is a straight line bore inclined at an angle to form a generally straight line continuation of the first passageway when the handle assembly is in its first position and to form a generally straight line continuation of the second passageway when the handle assembly is in its second position.

18. The apparatus of claim 15 further characterized in that said handle assembly includes a generally cylindrical portion having said second surface and an elongated handle portion joined to said cylindrical portion opposite said second surface and extending away from said cylindrical portion in a direction generally parallel to the pivot axis of said pivot mounting means and at an angle of about 40°–75° relative to a plane parallel to said second surface.

References Cited

UNITED STATES PATENTS 2,550,827   5/1951   Lachmiller _____ 222—308
3,147,890   9/1964   Mittelsteadt _____ 222—306 X SAMUEL F. COLEMAN, Primary Examiner H. S. LANE, Assistant Examiner U.S. Cl. X.R.

222—306, 363